July 18, 1933.   L. F. BIGGINS   1,918,585
METHOD AND APPARATUS FOR INCUBATING AND HATCHING EGGS
Original Filed May 31, 1927   3 Sheets-Sheet 1

Inventor
Leo F. Biggins
By Owen & Owen
Attorneys

July 18, 1933. L. F. BIGGINS 1,918,585
METHOD AND APPARATUS FOR INCUBATING AND HATCHING EGGS
Original Filed May 31, 1927    3 Sheets-Sheet 3

Inventor
Leo F. Biggins
By Owen & Owen
Attorneys

Patented July 18, 1933

1,918,585

UNITED STATES PATENT OFFICE

LEO F. BIGGINS, OF ADRIAN, MICHIGAN

METHOD AND APPARATUS FOR INCUBATING AND HATCHING EGGS

Application filed May 31, 1927, Serial No. 195,180. Renewed July 15, 1929.

This invention relates to incubators, but more particularly to that class of incubators employing a forced draft or current of heated air for maintaining the eggs at the proper temperature.

Objects of this invention are to produce an incubator in which the heated air is directed to the eggs in such a manner that they receive pure air at all times, and that the temperature of the chamber containing the eggs is maintained proper for incubation and hatching purposes; to provide a method of hatching eggs in which the eggs are so arranged that an adequate supply of air may be delivered thereto and mechanically agitating and distributing the air in such manner that an even, continuous current of air is supplied to the eggs during the hatching period; to produce a method of incubating and hatching eggs in which trays of eggs are incubated in one chamber and subsequently hatched in a separate chamber; and to provide an incubator having the new and improved features of construction, arrangement and operation hereinafter described.

An outstanding characteristic of my invention resides in forcing a current of heated air in an indirect manner transversely between the trays of eggs in a continuous manner so that all the eggs are continuously supplied with the necessary amount of fresh air, and that the temperature of the eggs is maintained proper for the purpose.

Figure 1:
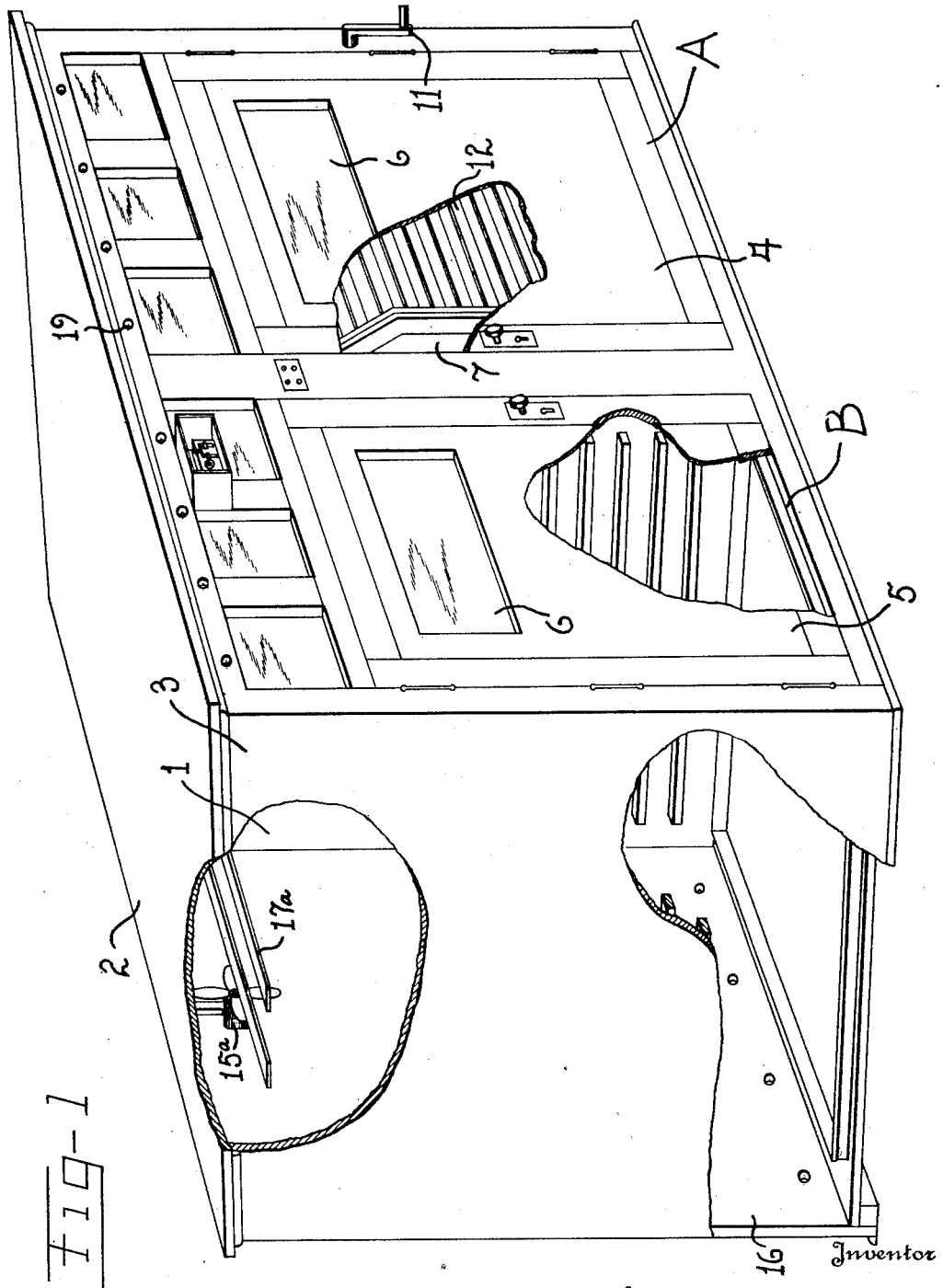
Figure 2:
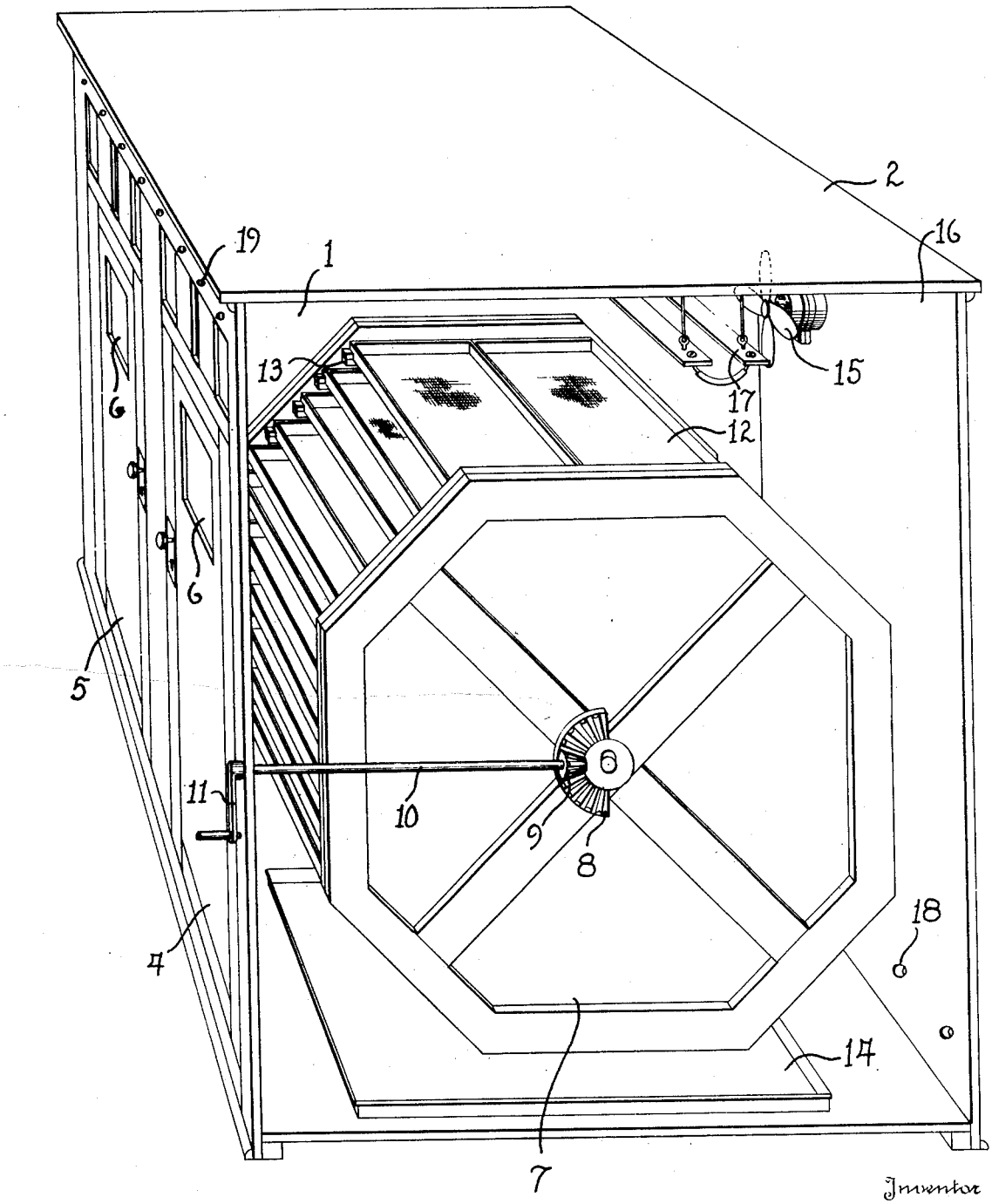
Figure 3:
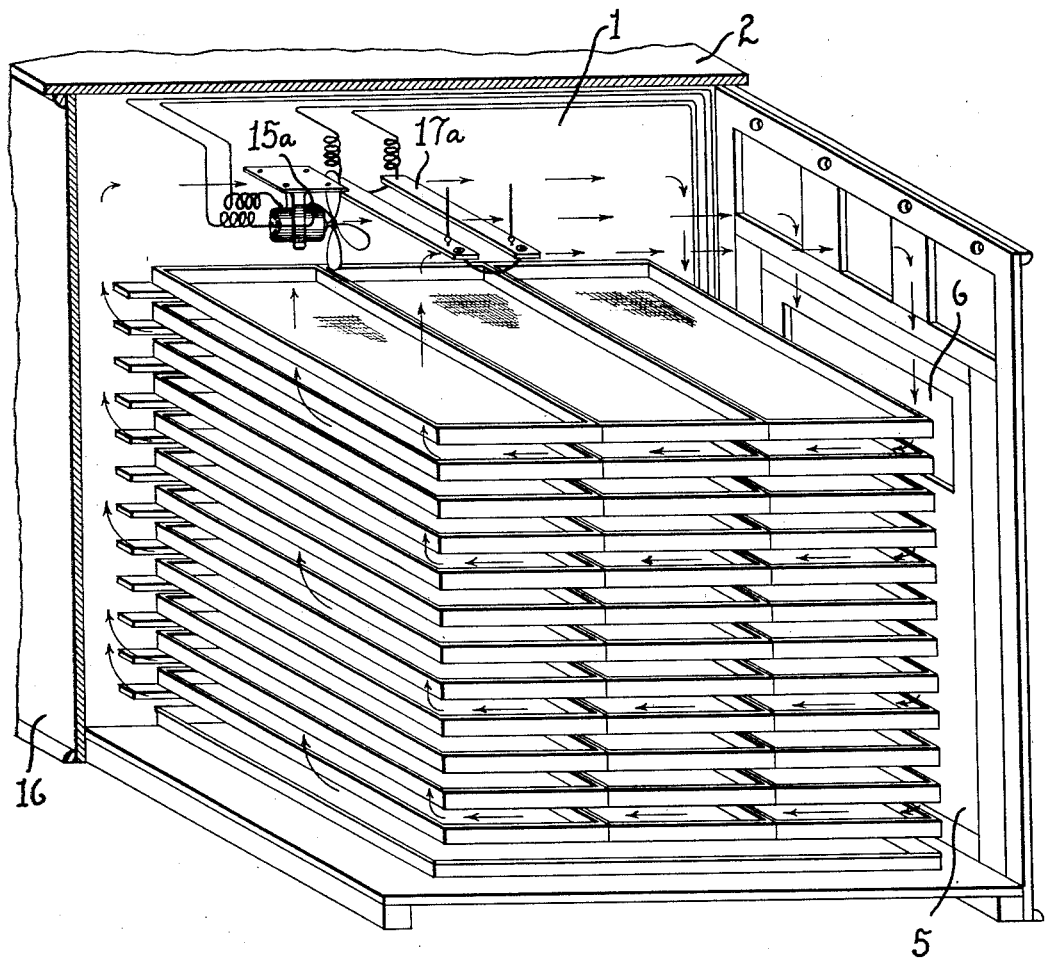

The invention is shown by way of illustration in the accompanying drawings, in which:

Fig. 1 is a perspective view of the combined incubator and hatcher with some of the parts broken away to show the inside; Fig. 2 is a perspective view of the device with one of the walls removed to show the incubator construction; and Fig. 3 is a perspective view with some of the parts broken away from the hatcher.

The illustrated embodiment of the invention comprises an incubator A and hatcher B. These two are combined into a single casing with the center wall or parts thereof forming a common wall for each apparatus. The common wall is indicated at 1, and covering the apparatus is a top 2, the vertical end walls of the apparatus being indicated by the numeral 3. A door 4 is provided for the incubator A and a door 5 for the hatcher B, each door having a glass panel 6 to enable the inside of each chamber to be viewed from the outside. Arranged within the incubator A is a drum 7 which is supported by hubs journaled in suitable bearings for rotating movements. In order to rotate the drum 7, a sector 8 is fixed to one end of the drum and meshing with the sector is a pinion 9 attached to a shaft 10. Attached to the outer end of the shaft 10 is an operating handle 11 which may be rotated for turning the drum in one direction or the other, as will be apparent.

The drum 7 is adapted to support a plurality of trays 12, the bottoms of which are of wire mesh or other foraminous material. The trays 12 are arranged in parallel, vertically spaced relation, and can be readily removed from the drum as occasion demands. As shown, the trays are supported on guides 13 attached to opposite heads of the drum. Resting on the floor of the chamber is a pan 14 for water to maintain the proper humidity within the chamber.

For creating a continuous draft or current of air within the incubator chamber, an electric fan 15 is suspended from the under side of the top 2 adjacent the rear vertical wall 16 of the chamber, and is arranged to create a current toward the front of the chamber. Arranged in front of the fan 15 is an electric heating unit 17 which may be of any suitable or desired construction. It will be apparent that the fan and heating unit are disposed above the upper surface of the drum 7, and the current passes horizontally across the chamber until it comes in contact with the front wall of the chamber, which deflects the heated air downwardly, and a portion thereof passes in a horizontally disposed direction through the spaces between the egg trays 12, a portion of the air therefore passing over the eggs and beneath the eggs so that the temperature thereof is maintained at the proper degree and a continuous draft is created. It will be understood that the suction created in rear of the fan 15 assists in drawing air through the spaces between the trays and also entirely around the drum.

I have found that by passing the heated air by indirect means between the egg trays, that the most efficient incubation is produced. There is no danger of foul air devoid of oxygen being supplied to the eggs so that the eggs are enabled to breath fresh air at all times. As a consequence, the chicks from these eggs are sturdy and healthy.

To provide for the admission of fresh air into the closed chamber, small openings 18 are provided in the lower portion of the rear wall 16. Foul air may be expelled from the chamber through openings 19 in the upper part of the front wall of the chamber. The size and number of these openings are so chosen that but a small quantity of air is constantly drawn in and expelled from the chamber.

In operation I first place the eggs in the incubator A where they remain for a certain period of time, and are turned from time to time, but before the eggs are ready for hatching I remove them from the incubator and place them in the hatcher B. This enables the incubator to be thoroughly cleaned and sterilized before new eggs are placed therein, thereby providing an absolutely sanitary arrangement. The hatcher B is provided with stationary lateral guides or supports for the trays which are arranged in tiers in the manner indicated in Fig. 3. Positioned within the hatcher is a similarly arranged electric fan 15ª and heating unit 17ª, which are similarly arranged to the parts heretofore described so as to maintain a continuous current of air by the indirect method hereinbefore described and in a horizontal direction through the spaces between the egg trays. As the air current and the manner of creating the same have heretofore been described, it is not deemed necessary to repeat the same in connection with the hatcher. It will be understood that the eggs remain in the hatcher until hatching takes place, and are then removed; thereafter the hatcher can be thoroughly cleaned and disinfected. As this does not interfere with the incubator, the process can continue without interruption.

While I have shown and described a construction which is the best form known to me at the present time, it is to be understood that numerous changes in details of construction, arrangement and operation may be effected without departing from the spirit of the invention, especially as defined in the appended claims.

What I claim as new and desire to secure by Letters Patent is:

1. In an incubator, a housing, a stack of egg trays within the housing disposed in spaced relation one above the other, the ends and top and bottom of the stack being spaced from the housing, there being free space between the uppermost tray and the top of the housing, and there being horizontal openings at each end of the stack between each pair of trays and each opening having a depth substantially equal to the depth of the space between the trays and means located in said free space between the uppermost tray and the top of the housing to pass air horizontally above the stack from one end to the other and downwardly along the last end of the stack, then horizontally from the last said end to the first said end in currents entering and leaving the space between each two trays in a uniform continuous stream substantially as deep as the space between the trays and in such manner that the volume of air at any given point at one instant between the adjacent trays is the same as the volume passing the same point at any other instant, and to finally pass the air upwardly along the first end to complete the circuit.

2. An incubator in accordance with claim 1 wherein the horizontal openings are defined by the ends of the trays.

LEO F. BIGGINS.